United States Patent [19]
Bhave et al.

[11] Patent Number: 5,205,937
[45] Date of Patent: Apr. 27, 1993

[54] RECOVERY AND REUSE OF WATER-BASED CLEANERS

[75] Inventors: Ramesh R. Bhave, Cranberry Township, Pa.; Stephen P. Evans, III, Fort Worth, Tex.; Abraham S. Chen, Wexford, Pa.; Henry J. Weltman, Fort Worth, Tex.

[73] Assignee: U.S. Filter Membralox, Warrendale, Pa.

[21] Appl. No.: 875,840

[22] Filed: Apr. 30, 1992

[51] Int. Cl.$^5$ .............................................. B01D 61/14
[52] U.S. Cl. ....................................... 210/651; 210/652
[58] Field of Search ................ 210/634, 644, 649–652, 210/500.25, 500.26, 500.27, 510.1

[56] References Cited

U.S. PATENT DOCUMENTS

| | | | |
|---|---|---|---|
| 3,977,967 | 8/1976 | Trulson et al. | 210/23 |
| 4,069,157 | 1/1978 | Hoover et al. | 210/433 |
| 4,078,112 | 3/1978 | Bibeau | 427/444 |
| 4,086,164 | 4/1978 | Noda et al. | 210/46 |
| 4,092,242 | 5/1978 | Deane | 210/23 |
| 4,155,845 | 6/1979 | Ancelle et al. | 210/22 |
| 4,251,377 | 2/1981 | Schleinitz | 210/510 |
| 4,412,921 | 11/1983 | Leung et al. | 210/500.2 |
| 4,584,057 | 4/1986 | Rowe et al. | 162/16 |
| 4,678,477 | 7/1987 | The et al. | 23/305 |
| 4,692,251 | 9/1987 | Hilgren | 210/651 |
| 4,786,417 | 11/1988 | Miki et al. | 210/639 |
| 4,786,482 | 11/1988 | The et al. | 423/130 |
| 4,865,742 | 9/1989 | Falleti | 210/637 |

OTHER PUBLICATIONS

"Alternatives to Chlorinating Solvent Degreasing—Testing, Evaluation and Process Design," Evanoff et al., Process Technology '88, Aug. 1988.
"Emulsified Oily Degreasing Baths Regeneration By Ultrafiltration," Mavrov et al., Proceedings of 1990 International Congress on Membranes.

*Primary Examiner*—Frank Sever
*Attorney, Agent, or Firm*—Douglas G. Glantz

[57] ABSTRACT

The present invention provides a process for the ceramic filtration of contaminants from water-based cleaners by passing a feed solution of water-based cleaner and contaminants through a metal oxide membrane on ceramic support.

20 Claims, 10 Drawing Sheets

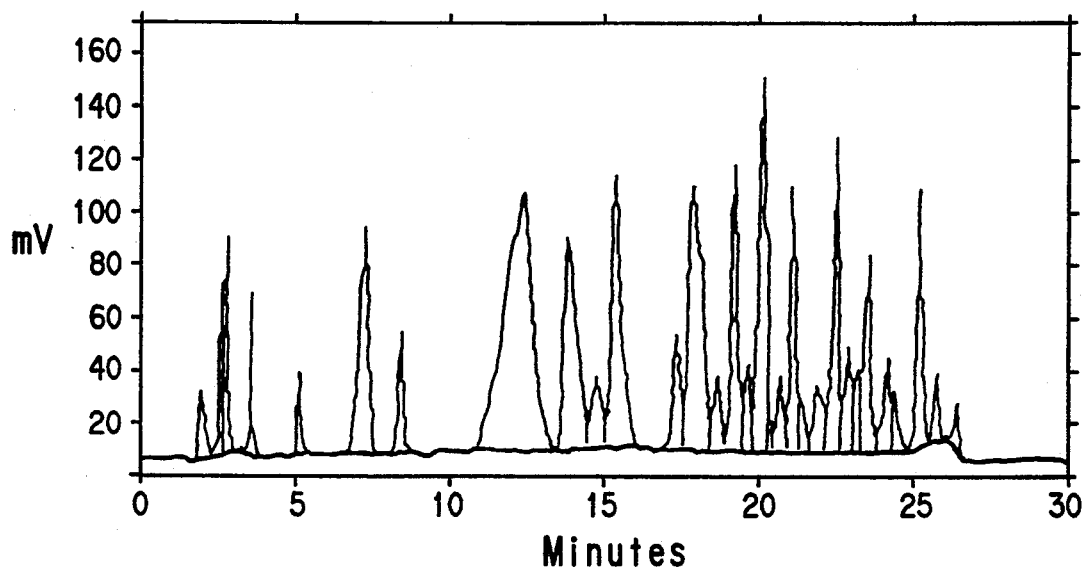
FIG. 3 – HPLC OF BRULIN 815 GD
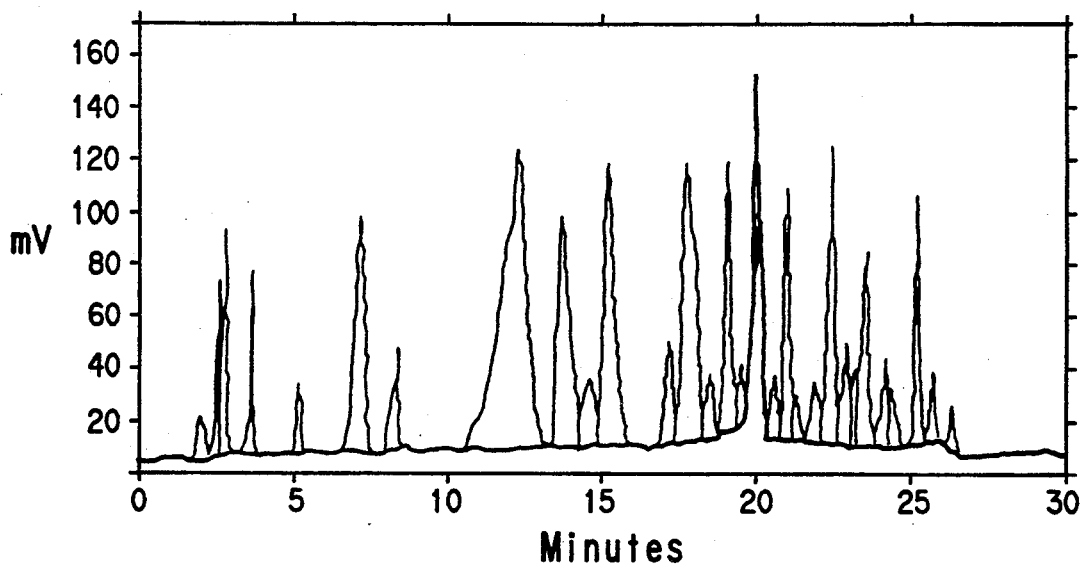
FIG. 4 – PERMEATE

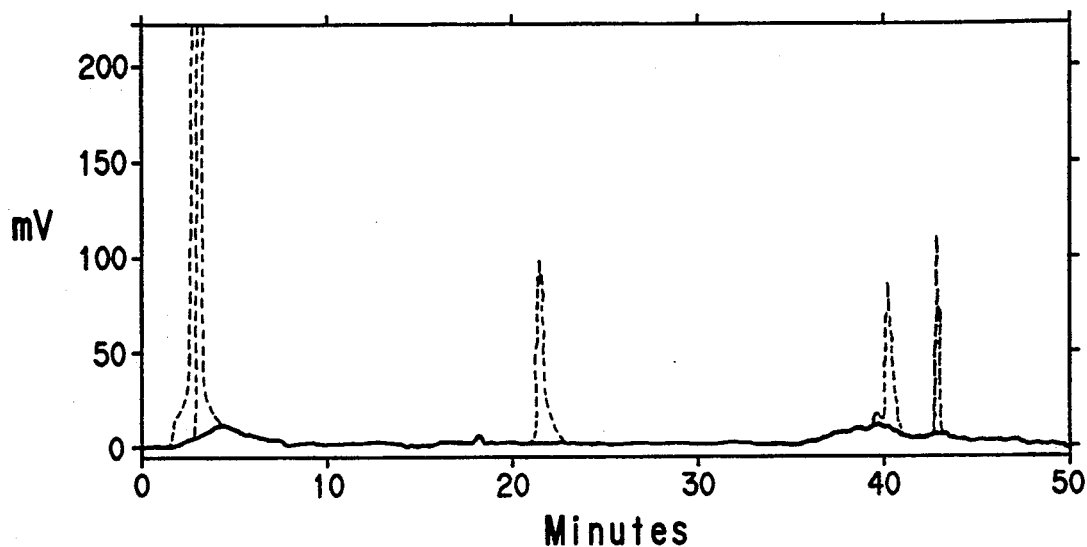
FIG. 5 — HPLC OF TURCO 42-15 NC-LT
PLUS NC-LT ADDITIVE — FEED
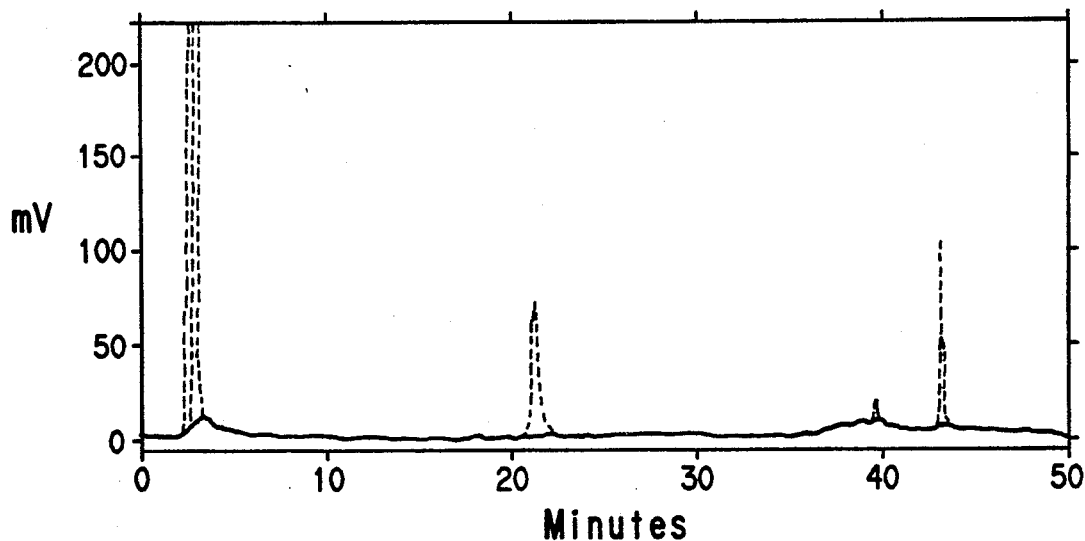
FIG. 6 — PERMEATE

BRULIN 815 GD WATER-BASED CLEANER:
FLUX VERSUS % SOIL IN RETENTATE

BRULIN 815 GD WATER-BASED CLEANER:
% CLEANER IN PERMEATE
VERSUS
% SOIL IN RETENTATE

BRULIN 815 GD WATER-BASED CLEANER:
% SOIL IN PERMEATE
VERSUS
% SOIL IN RETENTATE

TURCO 4215 NC-LT WATER-BASED CLEANER:
FLUX VERSUS % SOIL IN RETENTATE

TURCO 4215 NC-LT WATER-BASED CLEANER:
% CLEANER IN PERMEATE
VERSUS
%SOIL IN RETENTATE

TURCO 4215 NC-LT WATER-BASED CLEANER:
% SOIL IN PERMEATE
VERSUS
% SOIL IN RETENTATE

RECOVERY AND REUSE OF WATER-BASED CLEANERS

BACKGROUND OF THE INVENTION

This invention relates to recovery and reuse of water-based cleaners to remove contaminants.

Cleaning solutions are used in industrial manufacturing operations to degrease or clean contaminants from components, particularly metal components. For example, machined aircraft parts must be cleaned to prepare the aircraft part surfaces for further operations including, but not limited to, operations such as anodizing or plating.

Halogenated organic solvents, either as saturated vapors, boiling liquids, or as ambient-temperature liquids, are used currently as cleaning solutions.

Halogenated organic solvents are effective in cleaning machined parts but require special handling for personnel protection and in waste disposal for reasons of atmospheric contamination and surface water, ground water, and soil contamination. Further, environmental regulations require special waste disposal technologies. Residual depositions of organic solvents and solutions in the environment, in some cases, are the subject of studies to determine the extent of environmental degradation attributable to volatile emissions from degreasing operations, and groundwater and soil contamination. Volatile organic compound emissions are studied for their effect on smog in the lower atmosphere and ozone depletion in the stratosphere. Liquid organic compound discharges are studied for their effect on groundwater contamination and toxicity.

INTRODUCTION TO THE INVENTION

Because of the environmental concerns, water-based cleaners such as aqueous alkaline and emulsion-type water-based cleaners have been developed as substitutes or replacements for halogenated organic cleaners. These water-based cleaners are believed to possess water soluble characteristics which favorably influence their interaction with the environment.

Using water-based cleaners, the part to be cleaned is immersed in a tank containing a solution of water-based cleaner, or the cleaner is spray directly onto the part. After a period of cleaning, the water-based cleaner collects and contains contaminants, such as grease, dirt, metal-working lubricants, machining oils, and other soils.

As an alternative to disposing of the contaminated water-based cleaner into the environment, we have sought and developed a process to recover and recycle the water-based cleaner for reuse. Recycling not only reduces or eliminates the discharge of contaminated water-based cleaner into the environment, e.g., such as through municipal sewer systems and publicly owned water treatment works, but also reduces the overall cost of industrial processes using the water-based cleaner.

Conventional oil removal or soil removal technologies which rely on separation of phases, such as oil skimmers or coalescing separators, for purifying cleaners, are inadequate to remove strongly emulsified or dissolved contaminants from water-based cleaners. These phase-dependent methods are ineffective for regenerating water-based cleaner and do not provide consistent quality cleaner for reuse.

Other methods such as polymeric ultrafiltration are impractical because they cannot function in aggressive, higher temperature and extreme pH regimes and are subject to surface degradation attributable to metal particulate and other fine abrasive materials. Polymeric ultrafiltration membranes are difficult to clean when used for filtering high concentrations of soils. Polymeric ultrafiltration membranes provide only relatively low fluxes, i.e., low permeation rates per unit of filtering. Polymeric ultrafiltration membranes can not be back-pulsed at high pressures. Back-pulsing is the periodic application of counter pressure on the permeate side of the membrane element to push back a given permeate volume into the feed side of the membrane element to disrupt or destroy the gel layer or particle deposits on the membrane surface.

Trulson et al, U.S. Pat. No. 3,977,967, disclose a dynamic membrane on carbon support and an associated method for a dynamic membrane having a pore diameter of between about 0.1 and 2 micrometers to filter aqueous solutions containing oils and soluble industrial detergent. The support of carbon carries a dynamic membrane of a metal oxide coating, such as zirconia. The dynamic zirconia membrane cannot be cleaned and also can crack and flake from the carbon support. The dynamic membrane can not be cleaned or back-pulsed but rather must be reformed each time to be renewed.

Falletti, U.S. Pat. No. 4,865,742, discloses a method of treating polluted emulsions or micro-emulsions of oil in water through a tangential filtering through a number of singular tubes having a titanium oxide membrane of a pore size larger than about 0.2 microns.

We have developed a practical and efficient filtration method for regenerating contaminant-containing water-based cleaners for reuse in industrial cleaning processes and for cleaning the filter for repeated use.

The method of the present invention provides consistently high quality of recovered and recycled water-based cleaner, substantially intact, over a wide range of soil concentrations.

It is an object of the present invention to regenerate a contaminant-containing water-based cleaner for direct reuse in industrial cleaning processes.

It is a further object of the present invention to provide a method of separating contaminants from water-based cleaner through a filter providing acceptable flux and permeability, i.e., flux per unit transmembrane pressure, over a wide range of operating conditions.

It is still a further object of the present invention to provide a metal oxide membrane on a ceramic support which is able to withstand prolonged contact with fine abrasive materials.

It is a further object of the present invention to provide a filter which maintains acceptable flux under a wide range of contaminant concentrations.

It is a further object of the present invention to provide a filter which can be maintained and returned to operable condition by cleaning with acid and/or basic solutions.

These and other objects of the present invention will be fully described in the detailed description of the invention which follows with reference to the figures of the drawings appended to this application.

SUMMARY OF THE INVENTION

The present invention provides a process for the ceramic filtration of contaminants from water-based cleaners by passing a feed solution of water-based cleaner and contaminants through a metal oxide membrane on ceramic support.

In one aspect, the process of the present invention for separating a water-based cleaner from a feed solution containing the water-based cleaner and contaminants, e.g., such as oils, greases, waxes, emulsified lubricants, includes passing the feed solution cross-flow through a multichannel sintered monolithic metal oxide membrane on ceramic support to form a permeate of water-based cleaner. The sintered metal oxide membrane has a nominal pore size in the range of about 50 to 1000 Angstroms.

In another aspect, the process of the present invention for separating a water-based cleaner formulated of non-ionic surfactant from a feed solution contaminated with soils, other than fine emulsions, to form a permeate of water-based cleaner includes a multichannel sintered monolithic metal oxide membrane having a nominal pore size of 1000 Angstroms or greater.

BRIEF DESCRIPTION OF THE DRAWINGS

FIG. 3 is a high performance liquid chromatograph of a water-based cleaner, Brulin 815GD.

FIG. 4 is a high performance liquid chromatograph of the permeate of the combination of Brulin 815GD and the soil H-7007 after it has been passed through a 500 Angstrom zirconium oxide membrane on ceramic support.

FIG. 5 is a high performance liquid chromatograph of a second water-based cleaner, Turco 4215NC-LT.

FIG. 6 is a high performance liquid chromatograph of the permeate of the combination of Turco 4215 NC-LT and the soil H-7007 after it has been passed through a 500 Angstrom zirconium oxide membrane on ceramic support.

DETAILED DESCRIPTION

Figure 1:
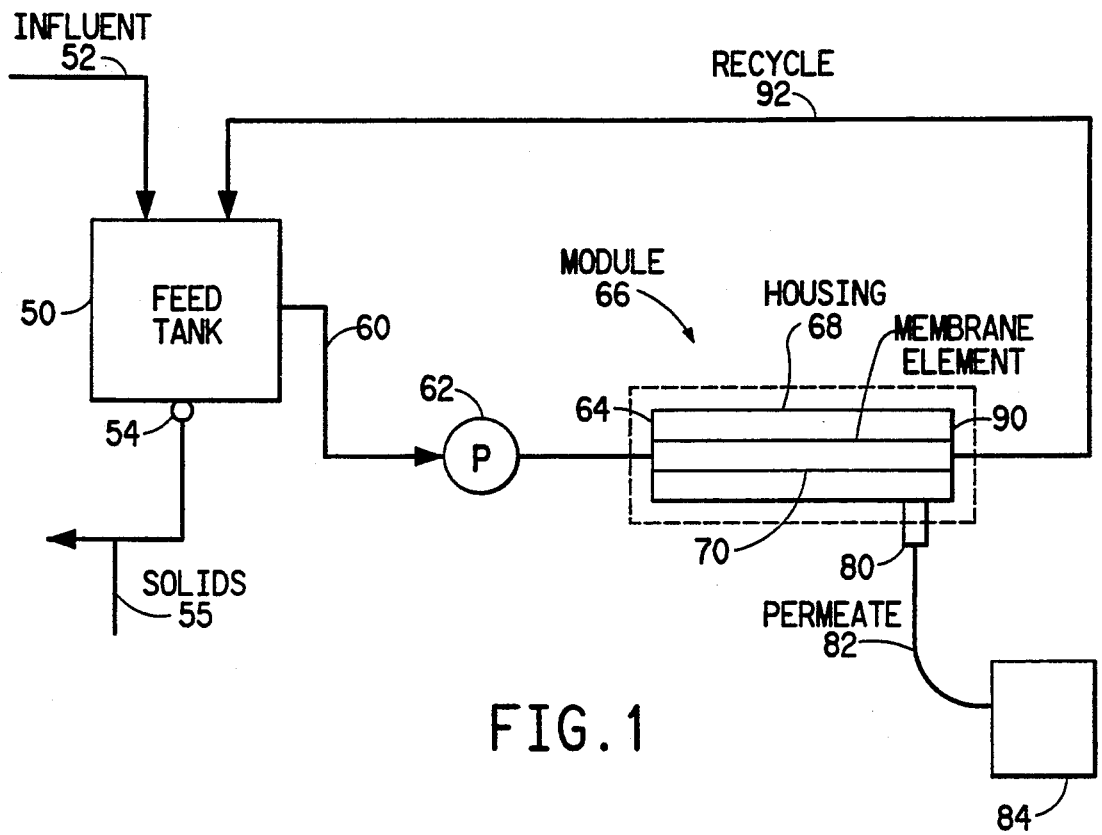
FIG. 1 is a schematic diagram of a system for separating a water-based cleaner from a feed solution containing water-based cleaner and contaminants.

We have found empirically that the process of the present invention provides an efficient and effective process for separating water-based cleaner from contaminant-containing water-based cleaner.

The metal oxide membrane on ceramic support substantially removes contaminants from contaminant-containing water-based cleaners, while purifying and recovering each of the cleaning solution constituents for the recycled water-based cleaner. The regenerated water-based cleaner is available for direct reuse for industrial cleaning processes.

We have observed that the process of the present invention provides unequalled advantages of maintaining flux at acceptable levels as soils are concentrated in the retentate with minimal fouling through extended operating times. The process of the present invention operates to filter out contaminants while minimizing decline in flux through the filter while operating to pass each cleaner constituent through the filter into the recovered water-based cleaner for recycling and reuse.

In one aspect of the process of the present invention, the membranes on ceramic support are chemically cleaned and can retain essential filtering characteristics in the aggressive, extreme pH regimes required during cleaning in strongly acid or alkaline solutions.

The water-based cleaners used in the method of the present invention include micro-emulsions of partially-miscible organic solvents and surfactants with several detergent builders or blends of broad spectrum anionic, non-ionic, and amphoteric surfactants plus detergent builders. These water-based cleaners presently are available commercially, and representative examples are sold by Brulin Corporation of Indianapolis, Ind. under the trade designation 815GD and by Turco Products Co. of Westminster, Calif. under the trade designations 4215 NC-LT and 3878 LF-NC.

We have found these water-based cleaners form stable micro-emulsions consisting of aggregates of micelles when soiled with low to medium molecular weight (less than 100 to 1000) hydrocarbons and hydrocarbon-based compounds. Individual surfactant molecules aggregate into micelles with aggregation numbers up to 100 for anionic and amphoteric surfactants and up to 1000 particularly in the case of micelles formed in the presence of non-ionic surfactants.

Surfactants are synthetic organic compounds made up of long hydrocarbon chains having an hydrophilic end and an hydrophobic end. The hydrophobic end of the surfactant is attracted to the hydrocarbon-based contaminants (such as grease or oil), and the hydrophilic end is attracted to water. The surfactant molecules dislodge and displace hydrocarbon-based soils from surfaces. Substantial numbers of these molecules group together to solubilize or suspend hydrocarbons in a surfactant-contaminant micelle. The suspended soil then can be washed away easily.

These water-based cleaners are used to clean structural materials. As used herein, the term "structural materials" means components, parts, and products made from one or more of the following materials: (i) steel; (ii) aluminum; (iii) titanium; (iv) alloys of ferrous metal, aluminum, and titanium; (v) fiberglass; and (vi) composite materials. The water-based cleaners operate effectively to remove contaminants from these parts.

As used herein, the term "contaminants" include, either singly or in mixtures, oils used in metal stamping, forming, bending, grinding, drilling, machining, and polishing; low to medium molecular weight hydrocarbons; paraffinic soils; waxes; petrolatum; non-chlorinated high viscosity hydrocarbons; chlorinated and sulfurized hydrocarbons; mineral oils; and vegetable oils. Also included in this term are materials which are partially soluble in the cleaners or which form stable micro-emulsions in water such as polyethylene and polypropylene glycol, oil-surfactant blends, water-soluble cutting fluids, machining coolants, unsaturated mono-, di-, and triglycerides, animal fats, fatty acids, and esters. Included in the term "contaminants" are insoluble solids such as extremely fine structural material particulate; inorganic, inert, or elemental solid particulate; and metal oxide particulate not dissolved by the particular water-based cleaning solution.

For the water-based cleaner to be available for reuse, each constituent of the water-based cleaner must be separated from the contaminants and recovered substantially intact.

Referring to FIG. 1, a representative system for separating contaminants from contaminant-containing water-based cleaner will be described. The used water-based cleaner containing contaminants is introduced into a feed tank 50 from influent line 52. The feed stream is produced and collected from machining operations. Feed tank 50 can hold from about 100 to 10,000 gallons, by way of example, of soiled water-based cleaner depending on the structural material size and geometry. The temperature of the feed stream can be in the range of about 30° to 70° C. Feed tank 50 is equipped with a blow-down valve 54 so that relatively large solid contaminants can settle in the feed tank 50 and be removed through line 55.

The feed stream minus settled contaminants is drawn through line 60 by pump 62 into the feed side 64 Of the separation membrane module 66. The separation membrane module 66 includes annular housing 68, preferably of stainless steel, which contains at least one longitudinal ceramic element 70 mounted therein. As will be explained further hereinafter with respect to FIG. 2, the ceramic element 70 includes a metal oxide membrane on ceramic support. Although only one ceramic element 70 is shown in module 66, any number of ceramic elements can be contained in a module.

As will be explained in further detail with respect to FIGS. 2A and 2B, a cross-flow or tangential flow filtration process is established. The feed stream minus settled contaminants enters element 70 at feed side 64 of element 66. The feed stream minus settled contaminants moves across or parallel to the membrane of the ceramic element 70 while removing permeate solution tangentially through the element. The permeate is transported away from the module 66 via permeate outlet 80 and permeate line 82 into permeate collection tank 84. Permeate is regenerated water-based cleaner. Regenerated water-based cleaner then can be reused in the industrial cleaning processes described above.

Flowing from the output side 90 of the module 66 is the concentrate which contains some unfiltered water-based cleaner and contaminants. Because a portion of the water-based cleaner has permeated through ceramic element 70, the concentrate or retentate will contain a greater concentration of contaminants relative to the initial feed stream. The concentrate will flow from output side 90 of the module 66 into output line 92 and eventually back into feed tank 50. This is a continuous process but can also be operated in a batch mode.

The process is continued until either the rate at which the flux through the ceramic element 70 decreases below a predetermined value or an unacceptable percentage of contaminants passes the ceramic element 70 along with the cleaning solution. In any case, the filter then is cleaned. The filter may be renewed by flowing acid or alkaline cleaners through ceramic element 70. The acid or alkaline solution contacts the ceramic element 70 membrane surface, but does not have to pass across the membrane as permeate. The composition of the ceramic support and membrane can withstand such harsh cleaning without sacrificing its essential characteristics.

Figure 2A:
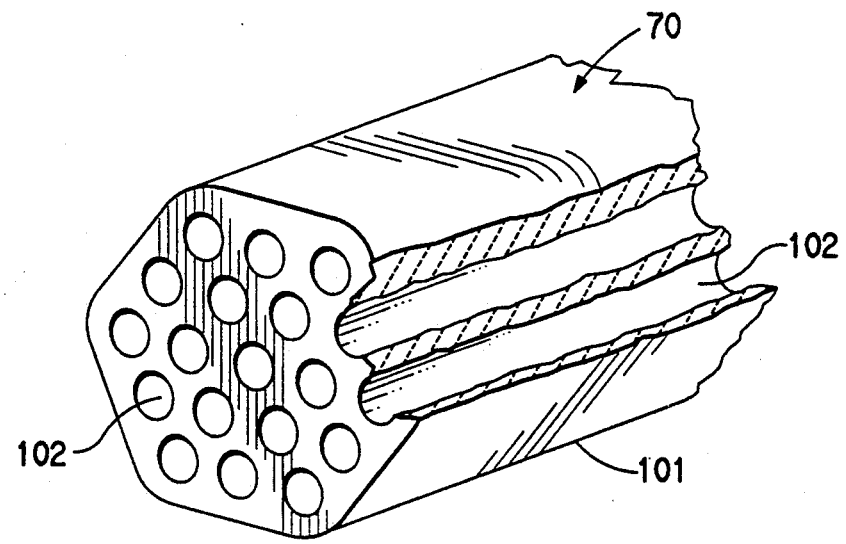
FIG. 2A shows a schematic representation of a membrane on ceramic support in accordance with the present invention.
Figure 2B:
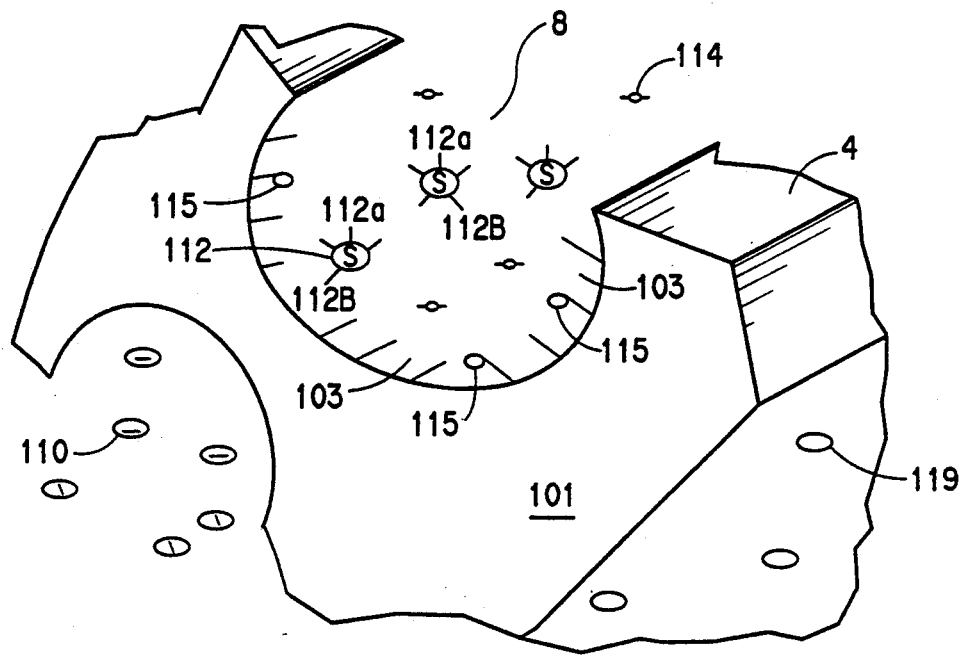
FIG. 2B is a detailed view of a section of the membrane on ceramic support of FIG. 2A.
Figure 2C:
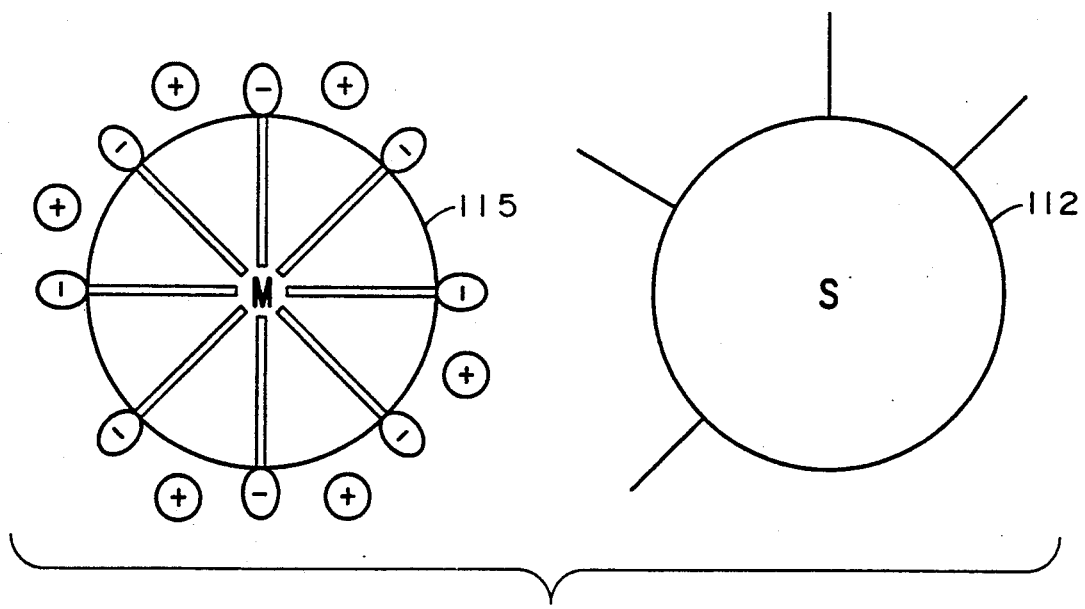
FIG. 2C depicts a representation of micelle and surfactant.

Referring to FIGS. 2A and 2B, a schematic diagram is shown of a portion of the ceramic element 70 used in accordance with the process of the present invention. Ceramic element 70 includes ceramic support 101 of alpha-alumina which has multiple channels 102 incorporated in monolithic support material. Channels 102 can be 3, 4, 6, or 7 mm in diameter and can be present in multiple number, such as the nineteen channel element depicted in FIGS. 2A. A one-channel element also can be provided as well as a thirty-seven channel element. A membrane layer 103 of metal oxide coating preferably is formed on the inside of axially oriented channels.

Ceramic support 101 is preferably an alpha-alumina, multi-layer support although other support materials such as iron oxide, titanium oxide, zirconium oxide, zeolite (alumina/silica oxide), and silicon oxide can be used. The alpha-alumina support is a multi-layer structure comprising one or more sublayers, e.g., such as a sublayer of 0.2 micrometers pore diameter preferably about an average of 20 micrometers thick. The membrane layer 103 is further supported on a second sublayer, e.g., of about 0.8 micrometers pore diameter of about an average of 40 micrometers thickness, on the other side of the first sublayer. This structure then is further supported on a porous support which has a pore diameter of about 10 to 15 micrometers and a thickness of about 1.5 to 2 mm. The above ranges are exemplary in nature and thinner membranes and supports can be used.

Membrane layer 103 is preferably made of a sintered zirconium oxide optionally with yttrium oxide as a stabilizer. Other metal oxide particles which can be employed as the membrane layer in the invention, either singly or in mixtures thereof, include sintered zirconia or alpha-alumina (alpha-alumina for applications requiring nominal pore sizes of the membrane of about 0.2 micron and above) or other sintered metal oxides which provide the characteristics required in the process of the present invention and which are capable of withstanding aggressive and extreme pH of alkaline or acid at elevated temperatures.

In one aspect, the process of the present invention includes using a ceramic support and sintered zirconium oxide membrane controlled to have nominal pore sizes of less than about 1000 Angstroms. By controlled nominal pore size is meant establishing an average pore size, e.g., such as about 500 Angstroms, including more than about 95% of the pore sizes within the range of about plus or minus 5% of the nominal pore size, e.g., such as plus or minus 25 Angstroms in the case of a 500 Angstroms nominal pore size. In one embodiment, the nominal pore size of the zirconium oxide membrane on the support of the present invention is about 500 Angstroms.

Raw materials for the outer coating of the membrane include zirconium oxide stabilized with yttrium oxide. These raw materials are mixed with water or alcohol and a suspending agent to form liquid suspensions called slips. The slips are deposited onto the support and are heated to drive off the liquid medium, to burn off the suspending agent, and to sinter the membrane.

Slip preparation from the yttrium oxide-stabilized zirconium oxide begins by mixing the $ZrO_2$ powder with water and organic additives to form a homogeneous suspension. The organic additives, polyvinyl alcohol, and ethanol act as deflocculating agents and also help to adjust the rheological properties of the slip. They are evaporated or burned off later in the manufacturing process. The suspension then is diluted with water.

The slip prepared by the above method next is allowed to flow over the support where it is deposited and dried. The newly-formed layer then is subjected to a heat treatment in an oxidizing atmosphere which removes excess water and alcohol. The heat treatment also oxidizes the organic additives and sinters the $ZrO_2$ particles, thereby fusing them to each other and to the support. Maximum temperatures during the heat treatment vary with the pore diameter desired for the final product, but preferably the temperatures reach at least 500° C. to ensure all organic additives have been oxidized.

The process of the present invention includes passing contaminant-containing water-based cleaner over the element in a cross-flow or tangential flow over the membrane layer of the ceramic element 70. By cross-flow or tangential flow, feed can be channeled essentially perpendicular to the flow of the permeate through the support as shown in FIGS. 2A and 2B.

In one embodiment, a specific membrane on support for the process of the present invention can be provided by Societe de Ceramiques Techniques (SCT) in Tarbes, France, a subsidiary of United States Filter Corporation having an office at 181 Thorn Hill Road in Warrendale, Pa. The SCT membrane is referred to as Membralox ® zirconia ultrafilter.

Referring again to FIGS. 2A and 2B, a schematic diagram is shown for cross-flow ultrafiltration in accordance with the process of the invention. Ceramic element 70 consists of a ceramic support 101 of alpha-alumina having multi-channels 102 incorporated in the monolithic support material. Channels 102 can be 3, 4, or 6 mm in diameter and are set up in multiple number, e.g., nineteen channels per element. A metal oxide membrane 103 is formed inside of the axially oriented channels 102. Membrane coating 103 provides the ceramic membrane on alpha-alumina support material.

The feed stream is the contaminant-containing water-based cleaner minus any settled contaminants removed through the solids relief valve 54 of the tank 50. The contaminants, as shown in FIG. 2B, include hydrocarbon-based soils 110, such as greases and oils, which have contained therein the surfactant 112 of the water-based cleaner as well as particulate 114. The feed stream also includes free surfactant 116 as well as detergent builders 118. Surfactant 112 includes an hydrophobic end 112a which enters the soil 110 and an hydrophilic end 112b exposed on the surface of soil 110. The combination of the attached surfactant and the soil 110 forms micelle 115. Micelles 115 coalesce. Eventually, free oils minus the surfactant 112 attached thereto will emerge and exit the element along with particulate 114. The permeate 119, including detergent builders 118, surfactant 112, and water molecules, permeates through the membrane 103 and support 101 and is collected as shown in FIG. 2B.

The separation process involves recovering the maximum amount of the cleaning constituents while at the same time separating out the maximum amount of the soils or contaminants. The optimum separation will be recovery of all of the cleaning constituents present in the feed solution. The recovery of cleaning constituents is measured as a percentage based on alkalinity expressed as % $Na_2O$, with the amount of cleaner constituents passing the membrane as the numerator and the amount of cleaner constituents in the virgin cleaner as the denominator. The optimum result is 100%, or that all of the cleaner constituents in the virgin cleaner have passed the membrane. High performance liquid chromatography also can be used to determine and compare the characteristics of the cleaner in permeate to those of the virgin cleaner.

It will be appreciated that per cent (%) cleaner passing the membrane is not the only relevant measurement. If, for example, the pore size of the membrane is very large, 100% of the cleaning constituents can be recovered, but all of the soils also will pass the membrane, thus making the permeate useless for recycling. Thus, another key measurement is the soil concentration in the permeate. The less soil in the permeate, the more useful the regenerated cleaner will be. Another measurement is the soil concentration in the feed stream. As more and more permeate (in the form of water molecules and cleaning constituents) is removed, the overall soil from the contaminated feed stream increases. At some point, fouling of the membrane occurs or flux drops to an unacceptable level. Longer periods of uninterrupted operation at higher soil concentrations in the feed stream, without fouling or decreased flux, are indications of superior filtration. Thus, sustaining acceptable flux over varying soil concentrations is a positive attribute for the membrane. The following actual examples illustrate the membrane and method of the invention provide superior results over prior art processes.

EXAMPLE I

A pilot scale unit operation depicted in the schematic of FIG. 1 was carried out incorporating a Membralox ® (a registered trademark owned by United States Filter Corporation, Membralox Products Group, Warrendale, Pa.) 500 Angstroms zirconium oxide sintered multichannel membrane on alpha-alumina support sealed into a separation membrane module.

When steady state was established in pressure, linear velocity of solution through the feed channels, and temperature, the permeate valve in the membrane module was opened, and a flux established corresponding to a transmembrane pressure differential of approximately 0.25 bar. Operating parameters were logged every five minutes over a thirty minute period. The permeate valve then was closed. Virgin membrane flux and permeability were calculated and served as a baseline for determining membrane regenerability. Ambient temperature deionized water then was added to the feed tank until the level was approximately 70% of operating volume.

Concentrated water-based cleaner was added until the amount necessary for the operating concentration was attained.

Water-based cleaners were Brulin 815GD cleaner made by Brulin Corporation of Indianapolis, Ind. and Turco 4215 NC-LT cleaner made by Turco Products Co. of Westminster, Calif. Brulin 815GD is a biodegradable liquid concentrated industrial cleaner containing non-ionic surfactants such as nonyl phenoxy polyethoxyethanol; anionic surfactant and amphoteric surfactant; sodium tripolyphosphate; and sodium silicates. Turco 4215 NC-LT is supplied as a crystalline solid compound which is mixed in the ratio of 8 oz. solid compound per gallon deionized water plus 2 vol. % liquid additive. Turco 4215 NC-LT solid compound consists of 45% sodium tetraborate pentahydrate; 35% sodium tripolyphosphate; less than 5% sodium silicofluoride; 5% sodium nitrate; and less than 5% nonyl phenoxy polyethylene glycol ether. Liquid additive contains 5 vol. % nonylphenol polyethylene glycol ether and 95 vol. % diethylene glycol monobutyl ether.

Deionized water wa added until the final desired operating volume was attained. The valves then were configured to enable circulation of the water-based cleaner solution through the feed side of the process. The permeate valve was opened, and the water-based cleaner solution allowed to permeate the membrane at steady state conditions with the permeate solution being returned to the feed tank. Operations were continued for a period of three to five days to identify any long term membrane fouling, as indicated by decreased flux over time.

After removal of water-based cleaner solution, the membrane was cleaned by circulating deionized water, followed by alkaline detergent, followed by deionized water, followed by acid solution, followed by deionized water passed through the system.

After cleaning, clean water flux of the cleaned membrane was calculated and compared to the virgin membrane flux.

The procedures of adding water-based cleaner to the deionized water as described hereinbefore were repeated, only this time the permeate was directed into a separate permeate tank. This "concentration mode" operation was continued until all feed solution had been processed. The operating parameters were monitored and controlled at desired set points or conditions. Samples of the feed and permeate solution were taken for every 20% of the solution volume processed. These samples were analyzed for cleaner constituent content. Any membrane fouling during operation enabled measurement of the degree of Cleaner separation in an unsoiled condition and served as the baseline condition.

The membrane was cleaned as described hereinabove, and the clean water flux measurement procedure was repeated to compare with virgin membrane flux under a controlled set of conditions.

Water-based cleaner was once again placed into the system and such cleaner solution was allowed to circulate in the system at 60° C.

A controlled amount of soils was added to cleaner solutions of Brulin 815GD (described hereinafter and in the Tables as "Cleaner B") and Turco 4215 NC-LT cleaner (described hereinafter and in the Tables as "Cleaner A").

The representative soils were H-431 and H-7007 made by E. F. Houghton & Co., Valley Forge, Pa. and H-11 sold under the designation Rando Oil No. 68 made by Texaco Co., Beacon, N.Y. H-431 is a metal cutting and drawing compound having principal constituents of mineral oil, sulfurized fatty oils, and chlorinated paraffins. H-7007 is a non-chlorinated, emulsifiable metal cutting and drawing compound having principal constituents of mineral oil and sodium petroleum sulfonate. H-11 is a solvent-dewaxed heavy paraffinic petroleum distillate used as an hydraulic oil in heavy machinery.

Soil H-11 was added to 1% concentration in the Cleaner A solution. The Soil H-11 in Cleaner A solution was circulated in the system. The permeate valve then was opened and adjusted to specified flux. The system operated in steady state condition with the permeate returned to the feed tank to establish a constant 1% soil in feed condition. Feed and permeate solution samples (approximately 8 oz.) were collected every two hours for approximately six hours. Operating condition data were collected approximately every thirty minutes.

The system then was placed in "concentration mode" with the permeate solution directed into a separate holding tank. Samples of feed and permeate were collected for each 20% of the feed solution volume processed as permeate. The operation continued until soil in feed approached 25–30% soil or until an unacceptably high transmembrane differential pressure was observed. A final membrane cleaning and clean water flux was conducted.

Thus, the steps of the process included:
1. Clean Water Flux and Permeability Calculation.
2. Cleaner Solution Flux Calculation—Steady State Mode.
3. Cleaning Regime.
4. Clean Water Flux and Permeability Calculation.
5. Cleaner Solution Permeability Calculation—Concentration Mode.
6. Cleaning Regime.
7. Clean Water Flux and Permeability Calculation.
8. Cleaner/Soil Permeability Calculation Steady State Mode.
9. Cleaner/Soil Flux Calculation—Concentration Mode.
10. Cleaning Regime.
11. Clean Water Flux and Permeability Calculation.

Soil concentration in the permeate was almost negligible. The soil concentration in the feed solution gradually increased since the volume of the cleaner is reduced by up to twenty-five times.

These steps were repeated with each of the Cleaner/Soil combinations as listed below:
1. Cleaner A/Soil H-11.
2. Cleaner A/Soil H-431.
3. Cleaner A/Soil H-7007.
4. Cleaner B/Soil H-11.
5. Cleaner B/Soil H-431.
6. Cleaner B/Soil H-7007.

A new membrane was used for each of the two different cleaners.

Table I presents operating characteristics for Cleaner B, and Table II presents operating characteristics for Cleaner A.

TABLE I

| | | | | | | | Soil Concentration % | | | Cleaner Passing Membrane* (%) | |
|---|---|---|---|---|---|---|---|---|---|---|---|
| | | Feed | | | ΔP (bar) | | Retentate | | Permeate | | |
| Soil | Period (Hr) | Vol (Gal) | Temp (°C.) | Flux (LMH) | I | F | I | F | I | F | I | F |

CLEANER B SOIL COMBINATION TESTS

| Soil | Period (Hr) | Feed Vol (Gal) | Temp (°C.) | Flux (LMH) | ΔP (bar) I | ΔP (bar) F | Retentate I | Retentate F | Permeate I | Permeate F | Cleaner Passing Membrane* (%) I | Cleaner Passing Membrane* (%) F |
|---|---|---|---|---|---|---|---|---|---|---|---|---|
| H-11 | 5.5 | 30 | 58–63 | 48 | 0.24–0.44 | | 1.2 | 6.0 | 0.004 | 0.007 | 100 | 100 |
| H-431 | 8.5 | 30 | 50–66 | 26 | 0.24–0.65 | | 1.2 | 5.0 | 0.11 | 0.37 | 100 | 100 |
| | 9.5 | | 56–64 | 22 | 0.375–6.1 | | 5.5 | 30.0 | 0.11 | 0.5 | 98 | 68 |

TABLE I-continued

CLEANER B SOIL COMBINATION TESTS

| Soil | Period (Hr) | Feed Vol (Gal) | Temp (°C.) | Flux (LMH) | ΔP (bar) I | ΔP (bar) F | Soil Concentration % Retentate I | Soil Concentration % Retentate F | Soil Concentration % Permeate I | Soil Concentration % Permeate F | Cleaner Passing Membrane* (%) I | Cleaner Passing Membrane* (%) F |
|---|---|---|---|---|---|---|---|---|---|---|---|---|
| H-7007 | 8.5 | 30 | 55–62 | 25 | 0.26–0.31 | | 1.2 | 4.3 | 0.001 | 0.001 | 100 | 100 |
| | 8.5 | | 57–66 | 20 | 0.375–3.3 | | 6.0 | 27.0 | 0.001 | 0.52 | 86 | 52 |

I = Initial
F = Final
*estimated based on change in alkalinity values.

TABLE II

CLEANER A SOIL COMBINATION TESTS

| Soil | Period (Hr) | Feed Vol (Gal) | Temp (°C.) | Flux (LMH) | ΔP (bar) I | ΔP (bar) F | Soil Concentration % Retentate I | Soil Concentration % Retentate F | Soil Concentration % Permeate I | Soil Concentration % Permeate F | Cleaner Passing Membrane* (%) I | Cleaner Passing Membrane* (%) F |
|---|---|---|---|---|---|---|---|---|---|---|---|---|
| H-11 | 43.5 | 250 | 49–63 | 41 | 0.27–0.75 | | 0.4 | 1.3 | 0.001 | 0.001 | 100 | 100 |
| | 45 | 250 | 53–65 | 38 | 0.17–2 | | 0.1 | 25.2 | 0.0001 | 0.045 | 100 | 99 |
| H-431 | 31 | 250 | 57–61 | 61 | 0.39–5.6 | | 0.4 | 5 | 0.001 | 0.12 | 100 | 98 |
| | 31 | 250 | 58–61 | 45 | 0.27–3.2 | | 5.9 | 11.7 | 0.15 | 0.33 | 98 | 95 |
| | 36 | 250 | 58–65 | 42 | 0.34–4.2 | | 16.5 | 19.5 | 0.33 | 0.89 | 95 | 85 |
| H-7007 | 84 | 250 | 58–64 | 25 | 0.1–0.14 | | 1.9 | 5.5 | 0.25 | 0.39 | 98 | 90 |
| | 127 | 250 | 57–62 | 15 | 0.1–1.5 | | 7.8 | 16.0 | 0.44 | 0.66 | 90 | 88 |

I = Initial
F = Final
*estimated based on change in alkalinity.

Referring to Table I and Table II, the percentage of cleaner passing through the membrane was determined relative to the initial unsoiled solution. In the case of soils containing esters of fatty acids, alkaline constituents of the water-based cleaner chemically reacted with soils in a saponification reaction. In the case of H-431 and H-7007 at high concentrations, the apparent percentage of cleaner in permeate was reduced. Cumulative total cleaner recovered in permeate at termination of runs with H-431 and H-7007 was 92% and 93%, respectively.

Table I and Table II show the ceramic membrane filtration process of the present invention maintains high permeate quality over a broad range of soil concentrations in feed solutions. Greater than 90% soil rejection and greater than 90% cumulative cleaner recovery were observed. Recovery at about 100% was observed in 4 of 6 runs conducted with feed solutions with soil concentrations of up to 5%. Soil retention greater than 99% was observed in 4 of 6 runs. For all soil in cleaner combinations, the process of the present invention facilitated treatment of the initial soiled solution to 1/30the of its initial volume, enabling use of the residue for energy recovery. In all cases, the membrane was cleaned at the end of each run using strong acid and basic solutions.

The Tables show that values of % cleaner passing into permeate off less than 100% indicate some retention of cleaner by the membrane. The retention is significant only above a soil concentration of about 10%.

Figure 7:
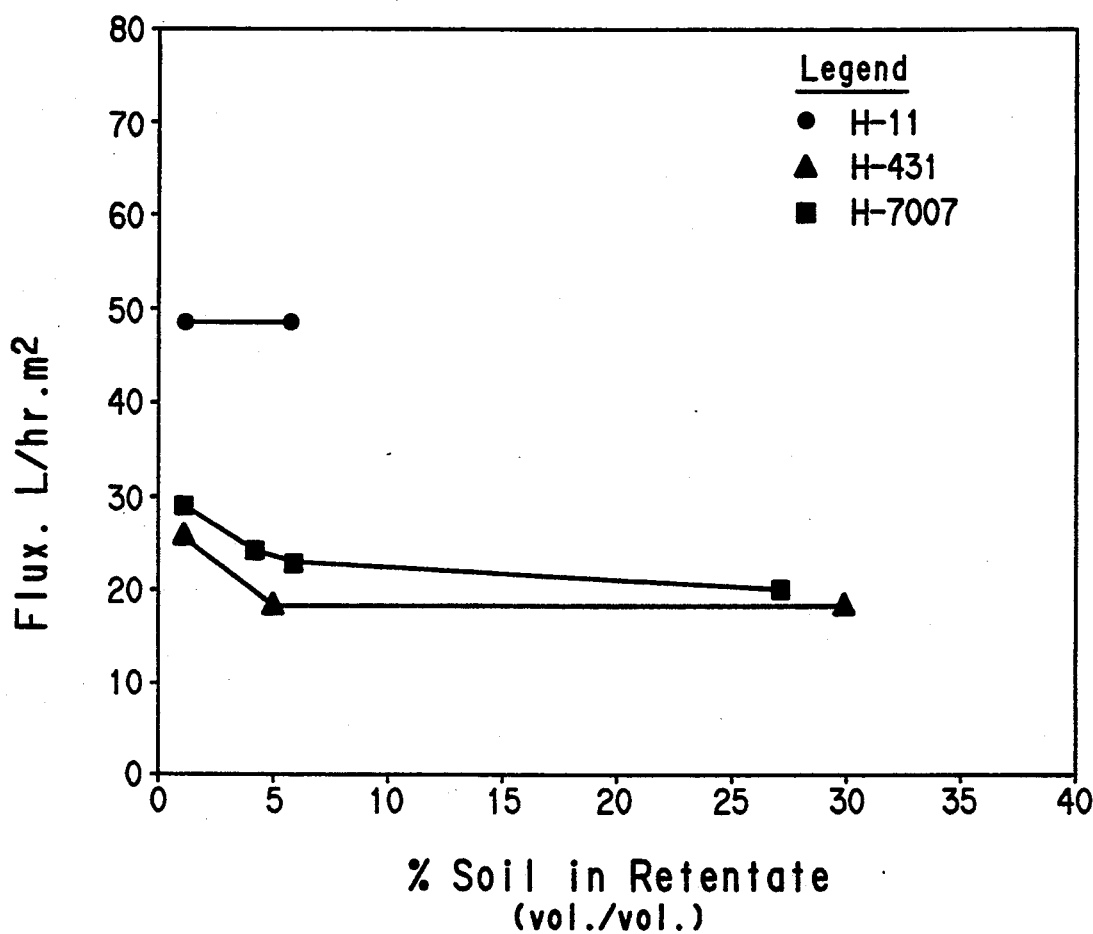
FIG. 7 is a graphical plot of flux versus per cent soil in retentate for Brulin 815GD water-based cleaner.
Figure 8:
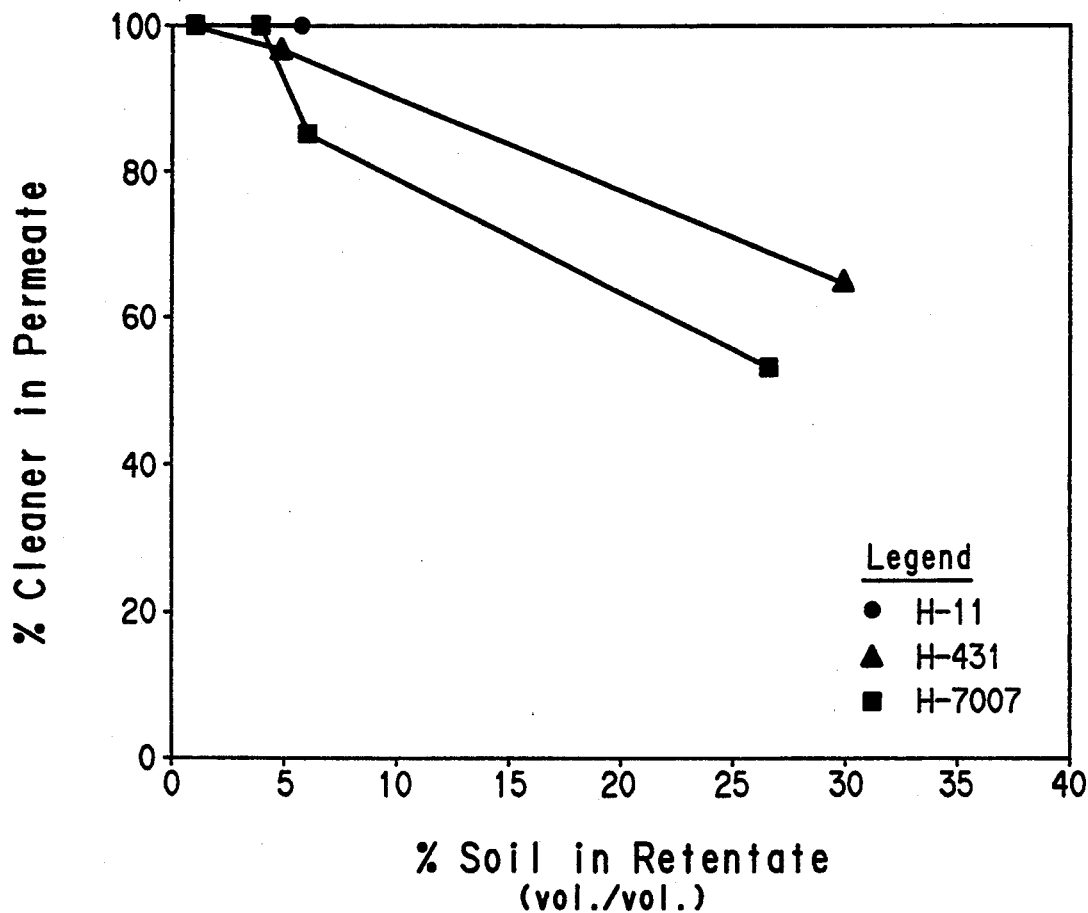
FIG. 8 is a graphical plot of per cent cleaner in permeate versus per cent soil in retentate for Brulin 815GD water-based cleaner.
Figure 9:
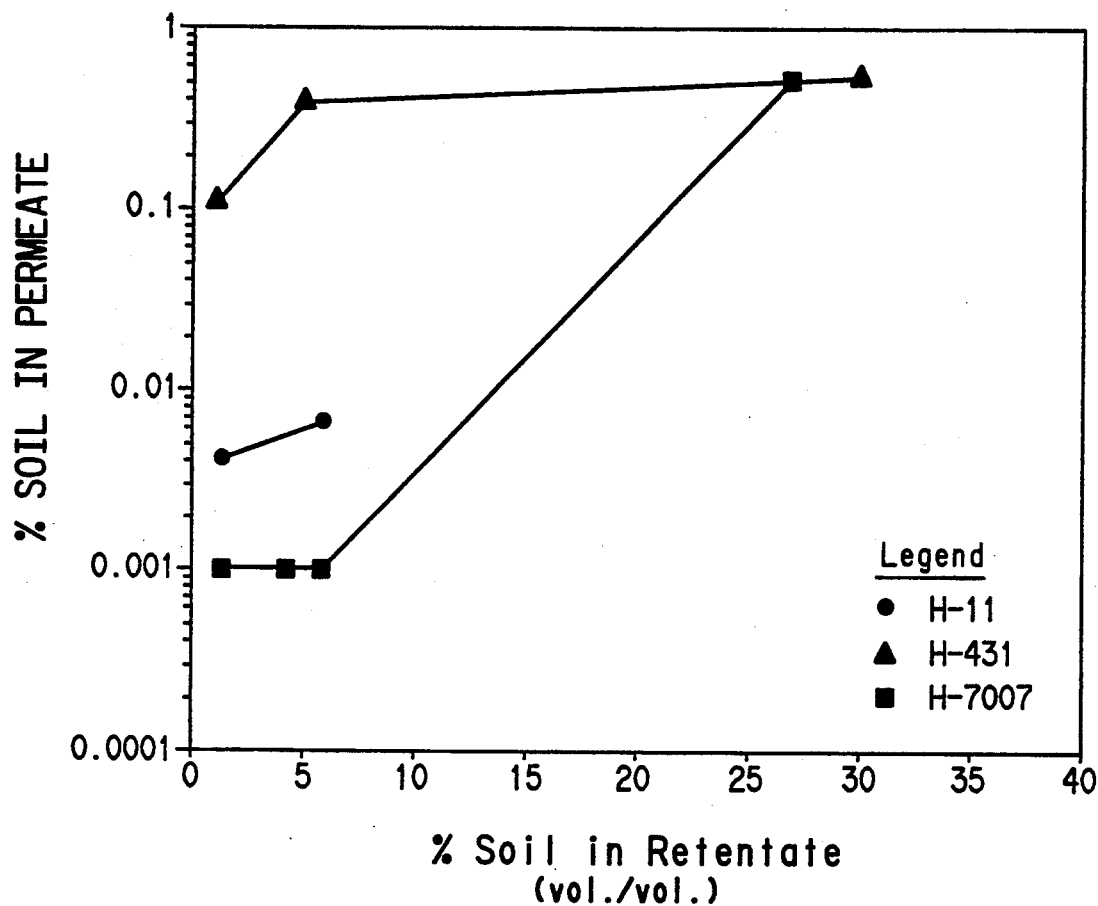
FIG. 9 is a graphical plot of per cent soil in permeate versus per cent soil in retentate for Brulin 815GD water-based cleaner.
Figure 10:
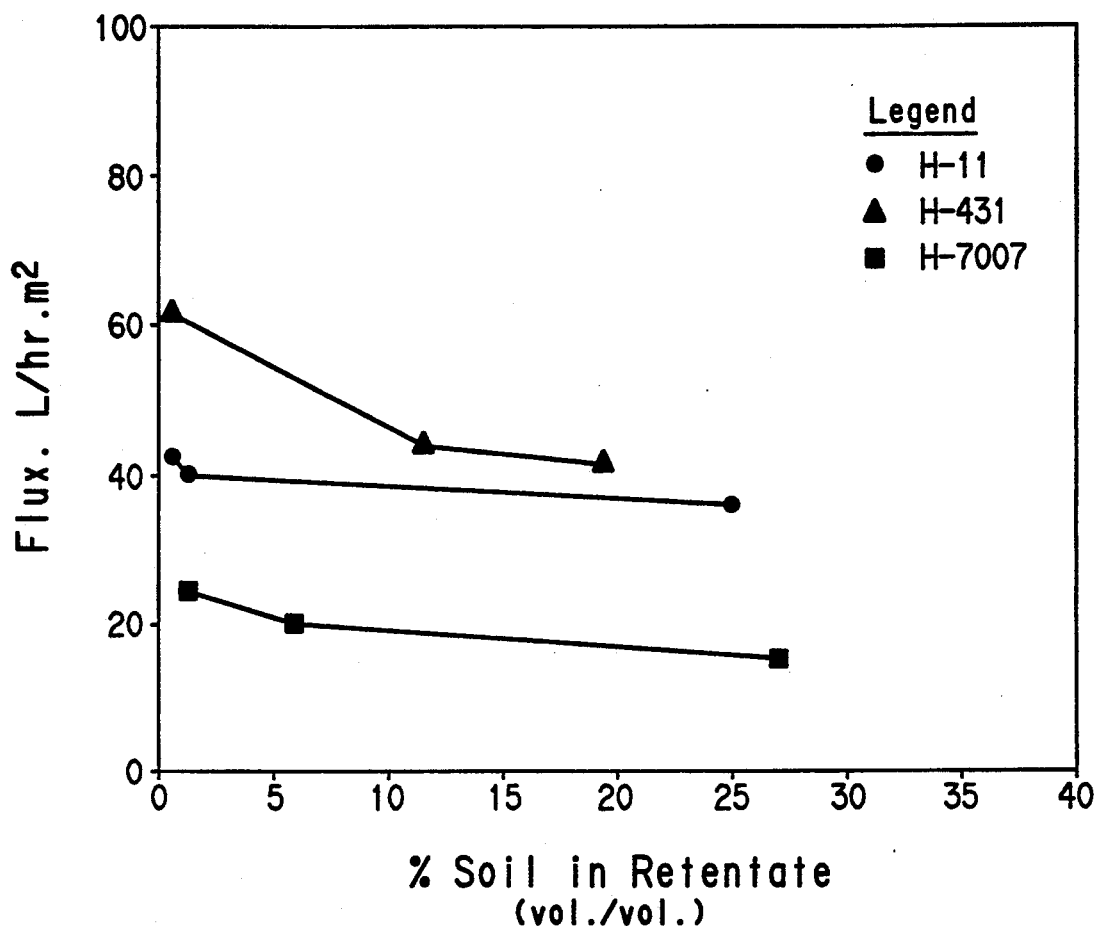
FIG. 10 is a graphical plot of flux versus per cent soil in retentate for Turco 4215 NC-LT water-based cleaner.
Figure 11:
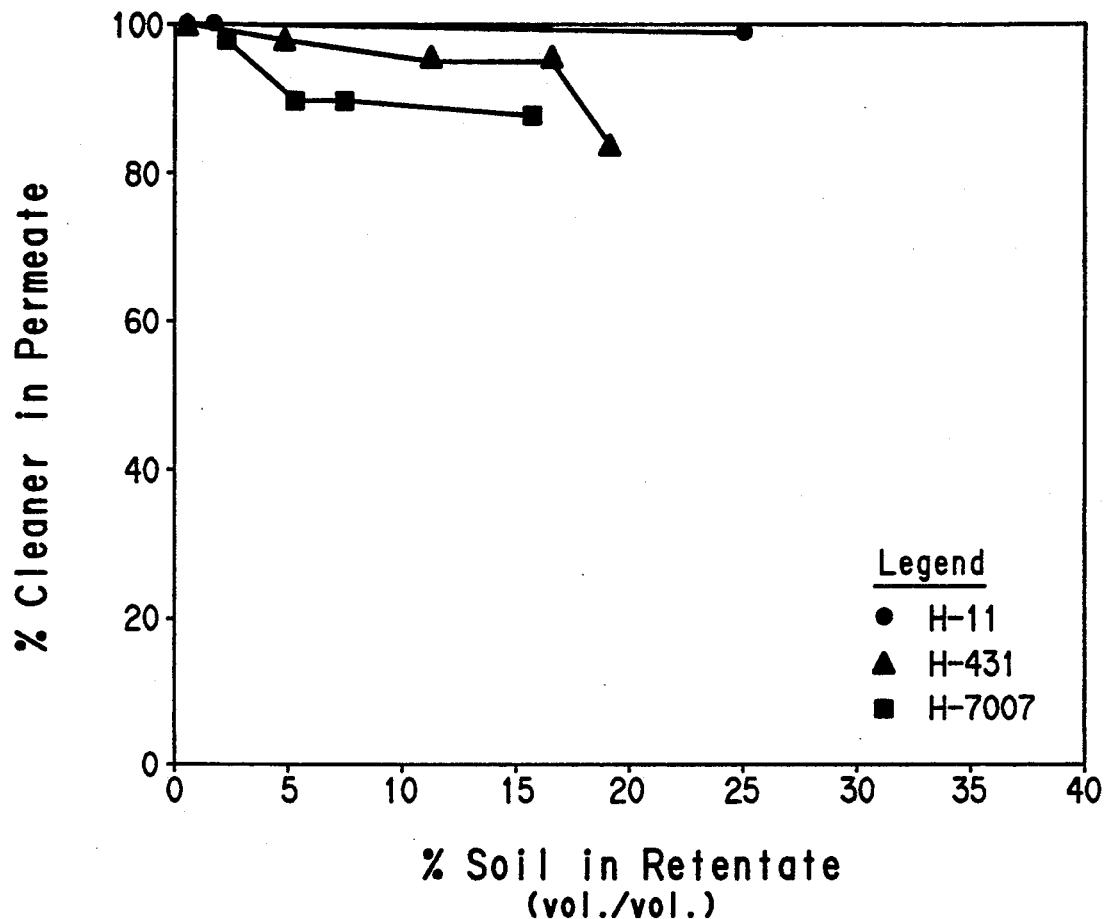
FIG. 11 is a graphical plot of per cent cleaner in permeate versus per cent soil in retentate for Turco 4215 NC-LT water-based cleaner.
Figure 12:
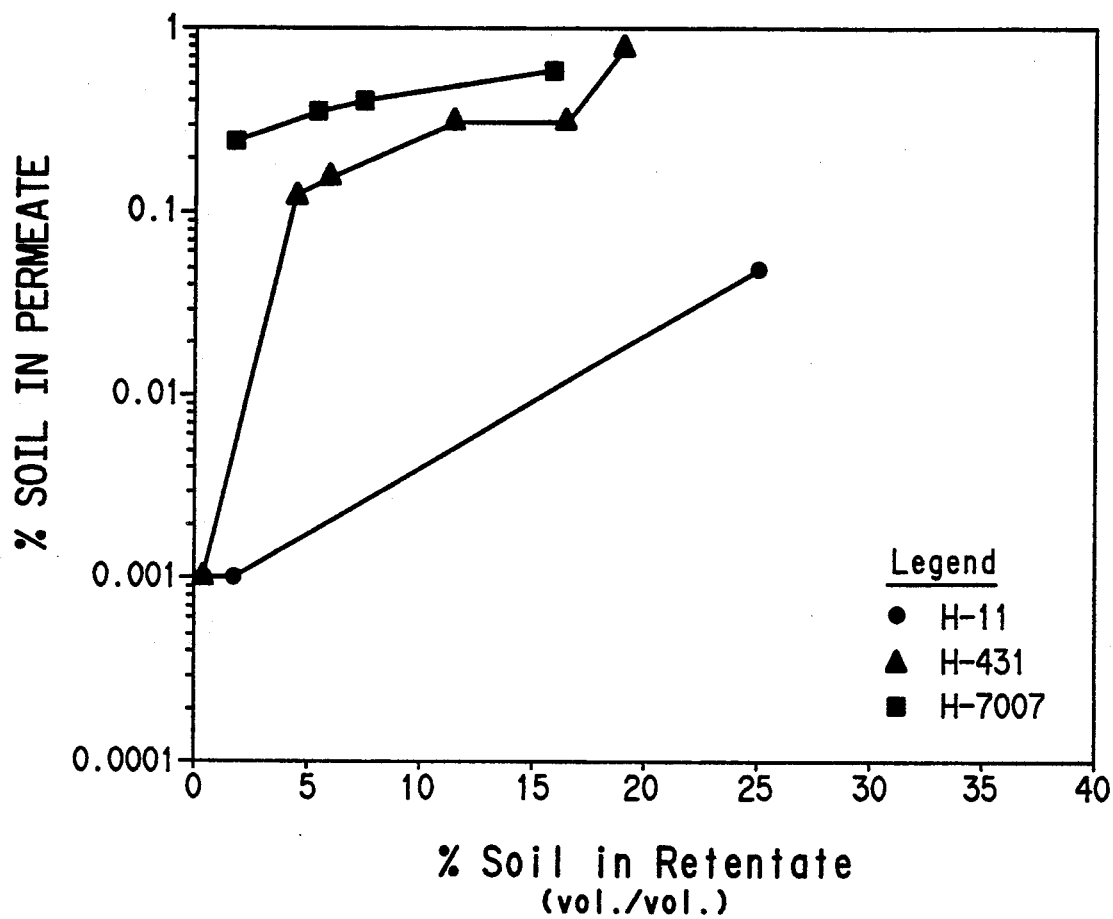
FIG. 12 is a graphical plot of per cent soil in permeate versus per cent soil in retentate for Turco 4215 NC-LT water-based cleaner.

FIGS. 7 through 9 show the performance of Brulin 815GD, and FIGS. 10 through 12 show the performance of Turco 4215 NC-LT, as a function of % soil in retentate.

FIG. 7 shows the effect of soil concentration in retentate up to 30% (vol./vol.) on the flux of the Brulin cleaner (Cleaner B) for the three soils H-11, H-431, and H-7007.

FIG. 8 shows that for up to about 10% soil in retentate, the cleaner is recovered substantially in the permeate.

FIG. 9 shows that for up to about 6% soil in retentate, a negligible fraction of soil is found in the permeate, except for H-431 which was permeated up to only about 50%.

FIG. 10 shows the flux versus soil concentration data for the Turco cleaner (Cleaner A). The flux values at high soil concentration were lowest with soil H-7007 which is a heavy paraffinic petroleum based hydraulic oil.

FIG. 11 shows that the cleaner was recovered substantially intact even at high soil concentrations in the retentate.

FIG. 12 shows that only a small percentage of soil passed (<5%) into the permeate even at high soil concentrations in the retentate.

Table III shows the cleaning rate for each of the water-based cleaners before and after being regenerated in accordance with the process of the present invention. Regenerated cleaner still was effective because cleaning times for the virgin and regenerated cleaner were the same.

In the case of Cleaner A, replacement of the additive returned the regenerated cleaner to its original condition.

TABLE III

CLEANING RATES BEFORE AND AFTER
MEMBRANE FILTRATION
(Hours:Minutes)

| | Cleaner A | | | Cleaner B | |
|---|---|---|---|---|---|
| Soil | Virgin | Permeate | Permeate Plus Add. | Virgin | Permeate |
| H-11 | :15 | :30 | :15 | :15 | :15 |
| H-431 | 1:00 | 2:00 | 1:00 | :45 | :45 |
| H-7007 | :45 | :45 | :45 | :45 | :45 |

Tables IV and V report the results of turbidity tests which show the concentration of the soils in the permeate of the respective cleaners.

TABLE IV

| | CLEANER B | |
|---|---|---|
| Soil | % Soil in Permeate | % Soil in Feed |
| H-11 | 0.004 | 1.0 |
| H-431 | 0.04 | 1.0 |
| H-7007 | <0.0001 | 1.0 |

TABLE V

| | CLEANER A | |
|---|---|---|
| Soil | % Soil in Permeate | % Soil in Feed |
| H-11 | <0.0001 | 0.5 |
| H-431 | 0.01 | 0.5 |
| H-7007 | 0.0 | 0.5 |

FIG. 3 shows a chromatograph for Cleaner B in its original condition. FIG. 4 shows a chromatograph for the Cleaner B permeate after soil was added and subsequently filtered through the 500 Angstroms zirconia membrane and alpha-alumina support. Peaks are approximately the same (height and area), indicating the essential characteristics of Cleaner B remained intact after use and regeneration.

FIG. 5 shows a chromatograph of Cleaner A in its original condition. FIG. 6 shows a chromatograph for Cleaner A permeate after soil was added and subsequently filtered through the 500 Angstroms zirconia membrane and alpha-alumina support. The peaks are approximately the same except for the nonyl phenol additive which was retained. This similarity in peaks indicates that the essential characteristics of Cleaner A remained intact after use and regeneration.

EXAMPLE II

The procedure of Example I was followed using a 0.2 micron alpha-alumina microfiltration membrane for the regeneration of Cleaner B to compare the result obtained by using a 500 Angstroms zirconium oxide membrane on alpha-alumina support. A nineteen channel single element 0.2 micron multichannel membrane was sealed into a bench scale stainless steel housing.

Cleaner B was prepared in 20 liter volumes in a concentration of 5% Cleaner B with tap water at 60° C. The cleaner/soil combinations were prepared at the recommended operating temperature of each soil by adding five volume percent of the following soils to the cleaner: H-11, H-431, and H-7007.

The feed stream was introduced into the element under pressure supplied from a pump, and a permeate stream was established tangentially to the feed system. The unit was run in a total recycle mode with permeate returned to the feed tank. Initial and final feed stream samples as well as permeate samples were collected. The permeate flux was varied between 40-165 LMH, and a cross-flow velocity of 3 m/sec was used. The transmembrane pressure varied over the range 0.2-1 bar. Higher cross-flow velocities or transmembrane pressures, or both, may be used.

The cleaner-only solution was run first to determine if the membrane passed the cleaner intact. Initial and final feed samples as well as permeate samples were collected. The H-11 soil then was added at operating temperature to make a 5 volume percent of soil solution and recirculated (with the permeate valve closed) to mix it into the cleaner only solution. When mixed, the soil in cleaner was passed through the membrane while feed and permeate samples were collected. The membrane was chemically cleaned and tested for fouling by a clean water flux test. The test was repeated using the H-431 and H-7007 soils.

The samples collected during tests were analyzed by HCl titration to determine concentration of Cleaners based on total alkalinity (expressed as % $Na_2O$, total dissociated anions and other ionic salts present) and free alkalinity (amount of dissociated hydroxyl and other anions present) in accordance with the procedures of "Standard Methods of Sampling and Chemical Analysis of Alkaline Detergents," ASTM Committee D-12, May 31, 1985. Results were compared to new cleaner solutions to determine removal of constituents of Cleaner B.

Turbidity tests measured the soil concentration in the samples and demonstrated the removal capacity of the membrane. Permeate samples were measured with a spectrophotometer and compared with a set of standard concentration curves to determine soil concentrations.

Table VI shows the recovery of total alkaline salt constituents for (i) Cleaner B alone; (ii) Cleaner B plus the soil; and (iii) the permeate for the three soils H-11, H-431, and H-7007.

TABLE VI

| 0.2 MICRON TITRATION RESULTS FOR CLEANER B | | | | |
|---|---|---|---|---|
| Sample | Free Alkalinity | Variation % | Total Alkalinity | Variation % |
| B Only | 1.35 | — | 0.58 | — |
| B + H-11 | 1.1 | −18.5 | 0.50 | −14.9 |
| Permeate | 1.25 | +13.6 | 0.58 | +16.9 |
| B Only | 1.25 | — | 0.55 | — |
| B + H-431 | 0.5 | −60.0 | 0.51 | −7.3 |
| Permeate | 0.45 | −10.0 | 0.51 | 0 |
| B Only | 1.1 | — | 0.49 | — |
| B + H-7007 | 0.4 | −63.6 | 0.49 | +0.6 |
| Permeate | 0.1 | −75.0 | 0.47 | −3.8 |

The H-11 soil in cleaner combination changes in total alkalinity after filtration ranged from −18.5% to +16.9%. The free alkalinity with H-431 and H-7007, however was reduced by 60 to 75% indicating a saponification reaction between the soils and the ester constituents in the cleaner. The permeate was not suitable for reuse as the cleaning constituents were no longer intact.

Visual observation of the permeate feed samples indicated that H-11 was removed from the permeate, but the H-431 and H-7007 soils had passed through the membrane with permeate. Visual observations indicated soils passed the membrane, and no turbidity tests were done.

Cleaner A, Turco 4215 NC-LT (discussed hereinbefore) also was tested in the 0.2 micron membrane system using procedures as with Cleaner B. Table VII shows total alkalinity for (i) Cleaner A alone; (ii) Cleaner A plus each of the soils H-11, H-431, and H-7007; and (iii) permeate for the three soils H-11, H-431, and H-7007. For free alkalinity, Cleaner A contains no free hydroxyl groups.

TABLE VII

| 0.2 MICRON TITRATION RESULTS FOR CLEANER A | | |
|---|---|---|
| Sample | Total Alkalinity | Variation % |
| A Only | 0.80 | — |
| A + H-11 | 0.78 | −3.5 |
| Permeate | 0.76 | −2.0 |
| A Only | 0.70 | — |
| A + H-431 | 0.74 | +6.7 |

TABLE VII-continued 0.2 MICRON TITRATION RESULTS FOR CLEANER A

| Sample | Total Alkalinity | Variation % |
|---|---|---|
| Permeate | 0.73 | −2.1 |
| A Only | 0.74 | — |
| A + H-7007 | 0.73 | −0.8% |
| Permeate | 0.75 | +3.0% |

Changes in total alkalinity for all cleaner/soils varied from 3.0% to −2.1%. Examination of the permeate and feed samples showed that H-11 was removed but that H-431 and H-7007 had passed the membrane. No turbidity tests were done on these samples as soils passed the membrane.

EXAMPLE III

A procedure was followed as in Example II. A multichannel 500 Angstroms zirconia membrane on alphaalumina support was substituted for the 0.2 micron membrane used in Example II. The same three soils (H-11, H-431 and H-7007) were used.

Table VIII shows the results from using Cleaner B as the cleaner.

TABLE VIII

500 ANGSTROMS TITRATION RESULTS FOR CLEANER B

| Sample | Free Alkalinity | Variation % | Total Alkalinity | Variation % |
|---|---|---|---|---|
| B Only | 1.55 | — | 0.64 | — |
| B + H-11 | 1.6 | +3.2 | 0.64 | 0 |
| Permeate | 1.6 | 0 | 0.64 | 0 |
| B Only | 1.1 | — | 0.56 | — |
| B + H-431 | 0.35 | −68.2 | 0.51 | −8.9 |
| Permeate | 0.45 | +28.6 | 0.42 | −17.1 |
| B Only | 1.0 | — | 0.54 | — |
| B + H-7007 | 0.25 | −75.0 | 0.56 | +3.5 |
| Permeate | 0.1 | −60.00 | 0.47 | −15.6 |

The free and total alkalinity did not change by more than +3.2% for the H-11. H-431 showed an increase of +28.6% in free alkalinity after filtration while H-7007 showed a decrease by 60%. A saponification reaction between the soils of H-431 and H-7007 and the cleaner accounted for up to a 75% decrease in free alkalinity.

Visual observation of the permeate indicated that the soils had been removed by the membrane and was confirmed by turbidity tests which showed the following concentrations in the soils.

TABLE IX

| Soil | Soil in Permeate (percent) |
|---|---|
| H-11 | 0.00003 |
| H-431 | 0.005 |
| H-7007 | 0.01 |

Greater than 99% of the soils were removed from the feed stream.

The procedure then was repeated using a multi-channel 500 Angstrom zirconia membrane on an alphaalumina support using Cleaner A and the three soils H-11, H-431 and H-7007. Table IX shows the results of total and free alkalinity.

TABLE X

500 ANGSTROMS TITRATION RESULTS FROM CLEANER A

| Sample | Total Alkalinity | Variation % |
|---|---|---|
| A Only | 0.71 | — |
| A + H-11 | 0.68 | −4.4 |
| Permeate | 0.72 | +5.9 |
| A Only | 0.76 | — |
| A + H-431 | 0.56 | −26.8 |
| Permeate | 0.68 | +21.1 |
| A Only | 0.76 | — |
| A + H-7007 | 0.74 | −3.3 |
| Permeate | 0.72 | −2.1 |

For free alkalinity, Cleaner A contains no free hydroxyl groups. The turbidity tests showed that greater than 99% of the H-11 and H-431 soils were removed, and 98% of the H-7007 soil was removed as shown in Table XI.

TABLE XI

| Soil | Soil in Permeate (percent) |
|---|---|
| H-11 | 0.0005 |
| H-431 | 0.8 |
| H-7007 | 2.0 |

EXAMPLE IV

The procedure of Example I was followed for the regeneration of turco 3878 LF-NC made by Turco Products Company of Westminster, Calif. Turco 3787 LF-NC (hereinafter referred to as Cleaner C) contains about 10% modified ethoxylate sodium salt, 5% sodium tripolyphosphate, about 5% diethylene glycol monobutyl ether sodium salt of anionic ethoxylated surfactants, and ethanolamine salt of anionic surfactants (together at up to 6%). Two soils were evaluated, Trimsol and SFG Plus. Trimsol, obtained from Master Chemical Corp. of Ohio, is a chemical emulsion concentrate used as an effective friction reducing lubricant in metal removal operations, at concentrations of 1% to 20%. Trimsol is a petroleum oil based emulsion containing glycols and glycol ethers and non-ionic surfactants. SFG Plus, obtained from Dryden Oil Co. of Md., is a synthetic fortified grease used on ball and roller bearings. SFG Plus is a blend of synthetic copolymer compounds and a calcium complex soap, and can be found in contaminated water-based cleaners, typically in concentrations up to about 0.5%.

Microfiltration membranes used in this actual example had pore sizes in the range of 0.2 to 0.8 microns. The membranes were unable to stop the passage of these two soils into the permeate. An ultrafiltration membrane having a nominal pore size of about 1000 Angstroms was observed not acceptable to retain these soils.

A 200 Angstroms sintered zirconia ultrafiltration membrane on alpha alumina support was observed to filter at a level of 100% soil retention at transmembrane pressures up to about 1 bar. At transmembrane pressures above 1 bar, some soils passage was observed in the form of a cloudy permeate. Permeate analysis showed passage of all cleaner constituents except for the retention of surfactants.

Table XII shows flux values and operating parameters. Flux values with the 200 Angstroms zirconia membrane at 10% Trimsol concentration were observed to be acceptable. Soils were 100% retained at lower transmembrane pressures.

TABLE XII

Cleaner C Soil Combination Tests

| Soil | Temp. °C. | ΔP bar | Flux LMH | % Soil in Retentate | *% Soil in Permeate | *% Cleaner in Permeate |
|---|---|---|---|---|---|---|
| Trimsol | 60 | 0.5 | 160 | 0.0 | 1 | 97 |
| | 60 | 0.5 | 42 | 0.0 | 10 | 94 |
| | 60 | 1 | 388 | 0.1 | 1 | 97 |
| | 60 | 1 | 68.8 | 1 | 10 | 94 |
| SFG | 60 | 0.5 | 250 | 0.0 | 0.05 | 97 |
| | 60 | 0.5 | 171 | 0.05 | 0.5 | 97 |
| | 60 | 1 | 211 | 0.07 | 0.5 | 97 |
| | 60 | 2 | 241 | 0.1 | 0.5 | 97 |

*estimated based on qualitative observations of permeate turbidity.

Although the invention has been illustrated by the preceding actual examples, it is not to be construed as being limited to the materials employed therein.

Whereas particular embodiments of the invention have been described hereinabove, for purposes of illustration, it will be evident to those skilled in the art that numerous variations of the details may be made without departing from the invention as defined in the appended claims.

What is claimed is:

1. A process for separating contaminants from micro-emulsion water-based cleaner in a feed solution containing said micro-emulsion water-based cleaner and contaminants comprising passing said feed solution by cross flow filtration through a sintered multichannel monolithic metal oxide membrane on ceramic support to form a permeate of said micro-emulsion water-based cleaner wherein said metal oxide membrane has a nominal pore size greater than about 50 Angstroms and less than about 1000 Angstroms and recovering micro-emulsion.

2. The process of claim 1, wherein said membrane on ceramic support comprises a porous sintered zirconium oxide on ceramic support.

3. The process of claim 2, wherein said support comprises alpha alumina.

4. The process of claim 3, wherein said metal oxide membrane has a nominal pore size less than or equal to about 500 Angstroms.

5. The process of claim 4, wherein said metal oxide membrane has a nominal pore size less than or equal to about 200 Angstroms.

6. The process of claim 1, wherein said water-based cleaner comprises partially miscible organic solvents, surfactant, and mixtures thereof, with detergent builder.

7. The process of claim 1, further comprising passing an acid or alkaline cleaning solution cross-flow through said metal oxide membrane on ceramic support to regenerate said metal oxide membrane on ceramic support.

8. The process of claim 1, wherein said membrane on ceramic support comprises a multichannel porous sintered zirconium oxide on ceramic support.

9. The process of claim 1, wherein said cross-flow filtration comprises maintaining a transmembrane pressure differential less than about 5 bars.

10. The process of claim 9, wherein said cross-flow filtration comprises maintaining a transmembrane pressure differential less than about 1 bar.

11. A process for separating contaminants from micro-emulsion water-based cleaner in a soiled cleaning solution containing micelles formed from non-ionic surfactant and cleaning contaminants, comprising passing said soiled cleaning solution containing micelles formed from non-ionic surfactant and cleaning contaminants cross-flow through a sintered multichannel monolithic metal oxide membrane on ceramic support to form a permeate of said micro-emulsion water-based cleaner, wherein said metal oxide membrane has a nominal pore size greater than about 0.1 micron and recovering micro-emulsion.

12. The process of claim 11, wherein said metal oxide membrane comprises a porous sintered membrane selected from the group consisting of zirconia or alpha-alumina.

13. The process of claim 12, wherein said metal oxide membrane on ceramic support has multiple axially oriented channels through which said feed solution can pass.

14. The process of claim 13, further comprising passing an acid or alkaline cleaning solution cross-flow through said metal oxide membrane on ceramic support to regenerate said metal oxide membrane on ceramic support.

15. A process of removing contaminants from structural materials by using micro-emulsion water-based cleaners separated from a used cleaning solution containing micro-emulsion water-based cleaning solution and contaminants, comprising passing said used cleaning solution through a multichannel metal oxide membrane on a ceramic support to form a permeate of said micro-emulsion water-based cleaner wherein said metal oxide membrane has a nominal pore size in the range of 50 to 1000 Angstroms; and using said permeate to clean structural materials and recovering micro-emulsion.

16. The process of claim 15, wherein said structural materials are made from materials selected from one or more of the group consisting of (i) ferrous metal alloys, (ii) aluminum, (iii) titanium, (iv) alloys of steel, aluminum and titanium; (v) fiberglass; and (vi) composite materials.

17. The process of claim 16, wherein said contaminants are organic materials, particulate, soils, oils, greases and metal filings.

18. The process of claim 17, wherein said passing said used cleaning solution through a metal oxide membrane comprises cross-flow or tangential flow over said membrane, and wherein said contaminants are present at a levels above about 5%.

19. The process of claim 18, wherein said metal oxide membrane on ceramic support has multiple channels through which said feed solution can pass and further wherein said contaminants are present at a levels above about 10%.

20. The process of claim 19, wherein said metal oxide membrane is selected from the group consisting of zirconia, titania, silica, and alpha-alumina.

* * * * *